(12) United States Patent
Arimilli et al.

(10) Patent No.: US 7,698,373 B2
(45) Date of Patent: *Apr. 13, 2010

(54) METHOD, PROCESSING UNIT AND DATA PROCESSING SYSTEM FOR MICROPROCESSOR COMMUNICATION IN A MULTI-PROCESSOR SYSTEM

(75) Inventors: Ravi Kumar Arimilli, Austin, TX (US); Robert Alan Cargnoni, Austin, TX (US); Derek Edward Williams, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/971,959

(22) Filed: Jan. 10, 2008

(65) Prior Publication Data

US 2008/0109816 A1    May 8, 2008

Related U.S. Application Data

(63) Continuation of application No. 10/318,514, filed on Dec. 12, 2002, now Pat. No. 7,356,568.

(51) Int. Cl.
*G06F 13/00* (2006.01)
(52) U.S. Cl. .................. 709/215; 709/216; 711/152; 711/153
(58) Field of Classification Search .............. 709/215, 709/213, 216, 227, 228; 712/225, 4; 711/153, 711/129, 152
See application file for complete search history.

(56) References Cited

U.S. PATENT DOCUMENTS 5,659,784 A    8/1997    Inaba et al.
5,805,917 A    9/1998    Sakurada et al.

(Continued)

FOREIGN PATENT DOCUMENTS

EP    330836    9/1989

(Continued)

OTHER PUBLICATIONS

Office Action dated Jul. 3, 2006, U.S. Appl. No. 10/318,514, USPTO.

(Continued)

*Primary Examiner*—Kenneth R Coulter
(74) *Attorney, Agent, or Firm*—Dillon & Yudell LLP (57) ABSTRACT

A processor communication register (PCR) contained in each processor within a multiprocessor system provides enhanced processor communication. Each PCR stores identical processor communication information that is useful in pipelined or parallel multi-processing. Each processor has exclusive rights to store to a sector within each PCR and has continuous access to read the contents of its own PCR. Each processor updates its exclusive sector within all of the PCRs, instantly allowing all of the other processors to see the change within the PCR data, and bypassing the cache subsystem. Efficiency is enhanced within the multiprocessor system by providing processor communications to be immediately transferred into all processors without momentarily restricting access to the information or forcing all the processors to be continually contending for the same cache line, and thereby overwhelming the interconnect and memory system with an endless stream of load, store and invalidate commands.

10 Claims, 8 Drawing Sheets

U.S. PATENT DOCUMENTS

| | | | |
|---|---|---|---|
| 6,145,007 | A | 11/2000 | Dokic et al. |
| 6,154,785 | A | 11/2000 | Lakhat et al. |
| 6,466,988 | B1 | 10/2002 | Sukegawa et al. |
| 6,516,403 | B1 | 2/2003 | Koyanagi |
| 7,073,004 | B2 * | 7/2006 | Arimilli et al. ............... 710/200 |
| 7,356,568 | B2 * | 4/2008 | Arimilli et al. ............... 709/215 |
| 7,359,932 | B2 * | 4/2008 | Arimilli et al. ............... 709/201 |
| 7,360,067 | B2 * | 4/2008 | Arimilli et al. ............... 712/225 |
| 7,493,417 | B2 * | 2/2009 | Arimilli et al. ............... 709/253 |
| 2003/0177273 | A1 | 9/2003 | Nakamura et al. |
| 2004/0117510 | A1 | 6/2004 | Arimilli et al. |
| 2004/0117511 | A1 | 6/2004 | Arimilli et al. |
| 2004/0117598 | A1 | 6/2004 | Arimilli et al. |
| 2004/0117603 | A1 | 6/2004 | Arimilli et al. |

FOREIGN PATENT DOCUMENTS

| | | |
|---|---|---|
| EP | 363882 | 4/1990 |
| EP | 665503 | 8/1995 |
| EP | 730237 | 9/1996 |
| JP | PUPA 02-238553 | 9/1990 |
| JP | PUPA 08-235143 | 9/1996 |
| JP | PUPA 10-083379 | 3/1998 |
| JP | PUPA 2000-187652 | 7/2000 |
| JP | PUPA 2002-202952 | 7/2002 |
| JP | PUPA 2002-342136 | 11/2002 |

OTHER PUBLICATIONS

Office Action dated Jun. 28, 2006, U.S. Appl. No. 10/318,516, USPTO.

Office Action dated Jun. 27, 2006, U.S. Appl. No. 10/318,515, USPTO.

* cited by examiner

Fig. 3B

| P1 | P2 | P3 | P4 |
|----|----|----|----|
| 0  | 0  | 0  | 0  |

$t_1$

| P1 | P2 | P3 | P4 |
|----|----|----|----|
| 1  | 1  | 0  | 1  |

$t_2$

| P1 | P2 | P3 | P4 |
|----|----|----|----|
| 1  | 1  | 1  | 1  |

$t_3$

| P1 | P2 | P3 | P4 |
|----|----|----|----|
| 2  | 1  | 1  | 2  |

$t_4$

| P1 | P2 | P3 | P4 |
|----|----|----|----|
| 2  | 2  | 2  | 2  |

METHOD, PROCESSING UNIT AND DATA PROCESSING SYSTEM FOR MICROPROCESSOR COMMUNICATION IN A MULTI-PROCESSOR SYSTEM

RELATED APPLICATIONS

The present application is a continuation of U.S. patent application Ser. No. 10/318,514 filed on Dec. 12, 2002, issued on Apr. 8, 2008, as U.S. Pat. No. 7,356,568, entitled "Method, Processing Unit and Data Processing System for Microprocessor Communication in a Multi-Processor System", which is also related to U.S. Pat. No. 7,493,417, issued Feb. 17, 2009; U.S. Pat. No. 7,359,932, issued Apr. 15, 2008; and U.S. Pat. No. 7,360,067, issued Apr. 15, 2008, which are assigned to the assignee of the present invention and incorporated herein by reference in their entirety.

BACKGROUND OF THE INVENTION

1. Technical Field

The present invention relates in general to data processing and in particular to communication between processors in a data processing system. Still more particularly, the present invention relates to a method, processing unit and system for processor communication and coordination within a multi-processor data processing system.

2. Description of the Related Art

It is well known in the computer arts that greater computer system performance can be achieved by harnessing the processing power of multiple individual processors in tandem. Multi-processor (MP) computer systems can be designed with a number of different architectures, of which various ones may be better suited for particular applications depending upon the intended design point, the system's performance requirements, and the software environment of each application. Known MP architectures include, for example, the symmetric multi-processor (SMP) and non-uniform memory access (NUMA) architectures.

In shared-memory, multi-processor data processing systems, each of the multiple processors in the system may access and modify data stored in the shared memory. In order to synchronize access to a particular granule (e.g., cache line) of memory between multiple processors, programming models often require a processor to acquire a lock associated with the granule prior to modifying the granule and release the lock following the modification.

In SMP architecture, the multi-processors communicate with each other over an interconnection bus utilizing "loads" and "stores" in and out of cacheable memory elements within the shared memory. When synchronizing the multi-processor system to perform pipelined or parallel processing, communication information is constantly transferred between the processors to allow each processor to coordinate with the other processors executing on the process. The processors communicate specific processor information, such as the state of a processor or status of a process, via loads and stores within the cache subsystem. When a processor reaches a state where its status information needs to be updated and communicated to the other processors, that processor takes exclusive control over the information by acquiring a lock over the data in order to change it. This causes the other processors holding this information to invalidate their copies and then load the status information again from memory after the first processor has stored its update to the information. This processor communication mechanism is inefficient because it requires the processors to constantly contend for control over the information, it requires flushing that information from the other processors, only to be reloaded again after the change has occurred, and it slows pipelined or parallel processes whenever a processor stores to the information and the other processors stall, awaiting update of the information.

The present invention recognizes that these inefficiencies consume large amounts of interconnect bandwidth and incur extremely high communication latency relative to the small percentage and small size of inter-processor communications and other transactions that are communicated between processors coupled by the interconnects. For example, even for the relatively simple case of an 8-way SMP system in which the four processors present in each of two nodes are coupled by an upper level bus and the two nodes are themselves coupled by a lower level bus, communication of a data request between processors in different nodes will incur bus acquisition and other transaction-related latency at each of three buses. Even inter-processor communications between processors in the same node must consume upper-level bus bandwidth and incur bus latency. Because such latencies are only compounded by increasing the depth of the interconnect hierarchy, the present invention recognizes that it would be desirable and advantageous to provide an improved data processing system architecture having reduced latency for communications between physically remote processors and having reduced bus bandwidth consumption, thereby freeing bus bandwidth for general data transfer between the processors and the hierarchical memory system.

SUMMARY OF THE INVENTION

In accordance with a preferred embodiment, a method, processor and multiprocessor system of processor communication is provided, wherein at least one of the processors of the plurality of processors contains a processor communication register (PCR) that provides it continuous access to the information stored therein. A processor retrieves information from one or more sectors of a PCR contained in a processor of the plurality of processors, wherein one of the sectors is allocated for storing by only an associated one of the plurality of processors; and stores information from the associated processor into its associated sector in each PCR in the plurality of processors.

In an alternative embodiment, at least two processors of the plurality of processors simultaneously retrieves information from their respective PCR. In still another preferred embodiment, the same information is contained in each respective PCR contained in the plurality of processors. In still another preferred embodiment, the information is useful to the plurality of processors in coordinating pipelined or parallel multi-processing. In still another preferred embodiment, each of the sectors of the one or more sectors is exclusively allocated for storing by only an associated one of the plurality of processors. In still another preferred embodiment, each of the sectors of the one or more sectors is four-bytes. In still another preferred embodiment, the processor continually updates each sector within each PCR such that each processor of the plurality of processors has access to information stored in its own PCR without loading such information from system memory.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
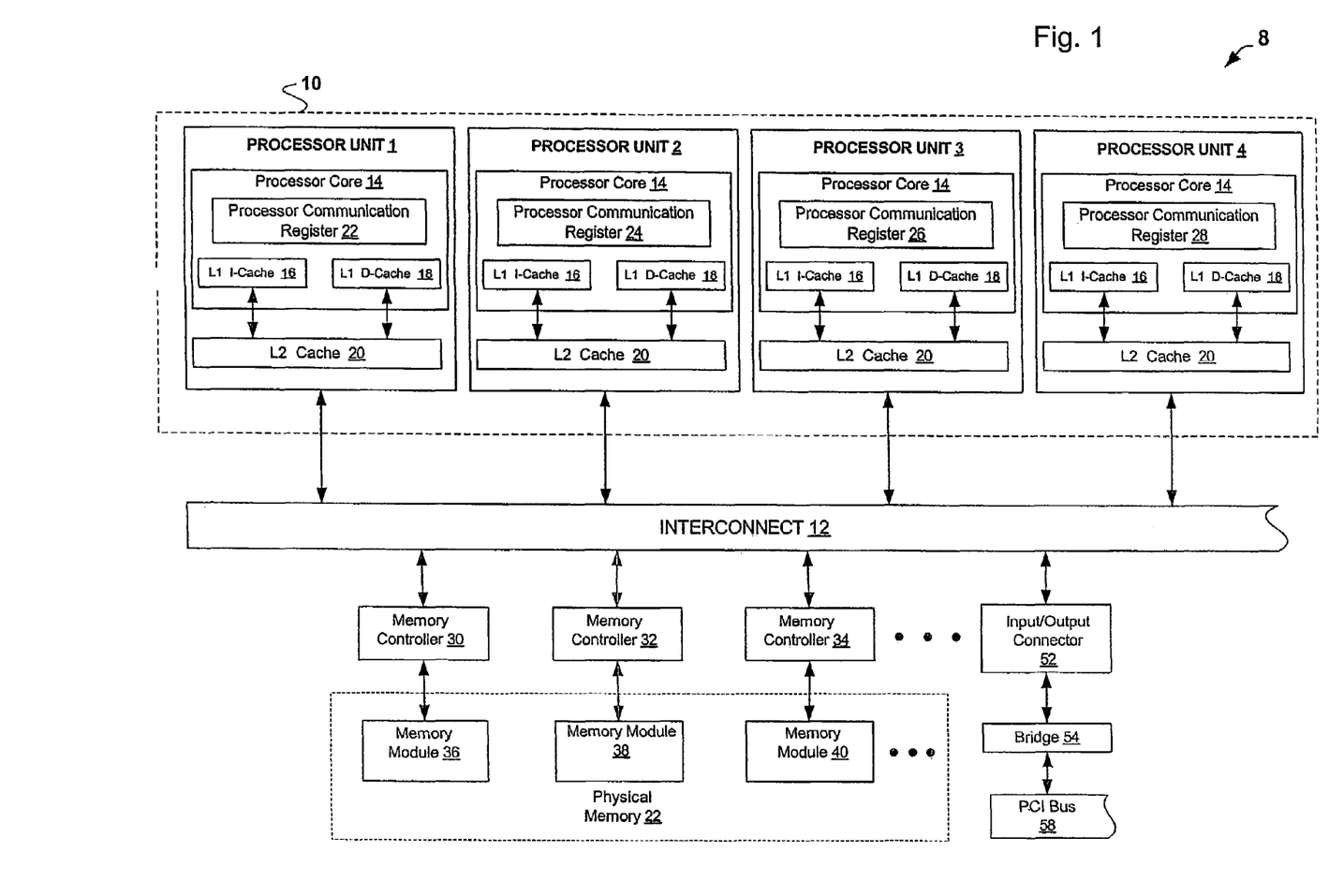
FIG. 1 depicts a high-level block diagram of a multiprocessor data processing system that supports microprocessor communication, in accordance with a preferred embodiment of the present invention.

With reference now to the figures and in particular with reference to FIG. 1, there is illustrated a high-level block diagram of a multiprocessor (MP) data processing system that supports microprocessor communication, in accordance with one embodiment of the present invention. As depicted, data processing system 8 includes a number (e.g., 64) of processing units 10 coupled for communication by a system interconnect 12. As depicted in the embodiment of FIG. 1, processing units 10 contains four processor units 1-4 for exemplary purposes; however, the preferred embodiment is not limited by any number of processor units and the invention will support any number or type of processor units. The present invention could be implemented in a data processing system having any number of processor units, for example, including 2, 4, 8, 16, 32, etc. processors in the multi-processor system. Each processing unit 10 is an integrated circuit including one or more processor cores 14. In addition to registers, instruction flow logic and execution units utilized to execute program instructions, each of processor cores 14 includes associated level one (L1) instruction and data caches 16 and 18, which temporarily buffer instructions and operand data, respectively, that are likely to be accessed by the associated processor core 14.

As further illustrated in FIG. 1, the memory hierarchy of data processing system 8 also includes the physical memory 22, comprising one or more memory modules (shown as memory modules 36, 38 and 40), which form the lowest level of volatile data storage in the memory hierarchy, and one or more lower levels of cache memory, such as on-chip level two (L2) caches 20, which are utilized to stage instructions and operand data from physical memory 22 to processor cores 14. As understood by those skilled in the art, each succeeding lower level of the memory hierarchy is typically capable of storing a larger amount of data than higher levels, but at higher access latency. As shown, physical memory 22, which is interfaced to interconnect 12 by memory controllers 30, 32 and 34, may store operand data and portions of one or more operating systems and one or more application programs. Memory controllers 30, 32 and 34 are coupled to and control corresponding memory modules 36, 38 and 40, respectively.

Also shown is input/output connector 52, which operates in a similar manner as processing units 10 when performing direct memory access operations to the memory system. As will be appreciated, the system may have additional input/output connectors, equal to input/output connector 52, connected to interconnect 12. As various input/output devices, such as disk drives and video monitors, are added and removed on PCI bus 58 (or other similar attached buses), input/output connector 52 operates to transfer data between PCI bus 58 and interconnect 12 through bridge 54.

Those skilled in the art will appreciate that data processing system 8 can include many additional unillustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of any architecture and are in no way limited to the generalized MP architecture illustrated in FIG. 1.

In accordance with a preferred embodiment, processor units 1-4 each contain a processor communication register (PCR) 22, 24, 26, and 28, respectively. Each PCR 22-28 stores identical information that is useful to the processors in a multi-processor system, such as processor communication information used to coordinate pipelined or parallel multi-processing. Each PCR 22-28 is a four-byte register that can be read by its associated processor unit, but where each of the four bytes is exclusively allocated for storing by only its associated one of the four processor units 1-4. (In an alternative embodiment, the PCR has thirty-two sectors that are each four bytes wide.) In operation, each processor unit 1-4 has continuous access to the contents of its own PCR and can store-through to its exclusive sector within its own and each of the other PCRs. In other words, each processor unit within the data processing system writes to each PCR contained in each of the processor units, but only to its designated portion of the PCRs. By the operation of the processor units, each PCR 22-28 is continually updated by each processor updating its sector within all of the PCRs, thereby instantly allowing each of the processor units 1-4 to see the change within the PCR data. For example, in one embodiment of the present invention, processor unit 1 would make a change to its sector within the PCRs by changing the data contained within its own PCR 22, and then transmitting a store-through command over interconnect 12 directed to the PCRs in each of the processor units 2-4 but bypassing the cache subsystem (including the L1 and L2 caches) altogether. Processor unit 1's store-through command would only address the sector allocated to it, which is the first byte within the four bytes of each PCR 22-28. Processor unit 3, for example, would send a store-through command to each of the other processor units 1, 2, and 4 that is addressed to the third byte within each PCR. It will be appreciated that PCRs 22-28 are not limited to any particular number of bytes held in the register or to any particular number of register bytes allocated to a particular processor, and that in alternative embodiments they may hold any number of bytes or allocate any number of register bytes to a particular processor.

As will be appreciated, the present invention substantially enhances efficiency within a multi-processor system by allowing processor communications to be immediately transferred into all processors without momentarily restricting access to the information or forcing all the processors to be continually contending for the same cache line, which typically overwhelms the interconnect and memory system with an endless stream of load, store and invalidate commands.

The preferred embodiment is particularly useful in applications where the multiprocessor system is performing a pipelined or parallel process. For example, in the prior art, when a processor completes its portion of a pipelined process, it stores processor communication information out to the cache subsystem indicating that it has completed its stage of the process. The next microprocessor in the pipeline continually polls its cache subsystem, waiting for updated status information. When the previous processor gains exclusive access and invalidates the status information in the caches, the next processor retrieves the updated status information from memory or the previous processor cache and checks the appropriate flags to determine if the process is ready for its stage. As will be appreciated, a significant amount of the interconnect bandwidth becomes consumed by inter-processor communications as all the multi-processors are loading and storing the same bytes of processor communication information regarding the pipeline within the cache in order to communicate and coordinate their processes.

Figure 2A:
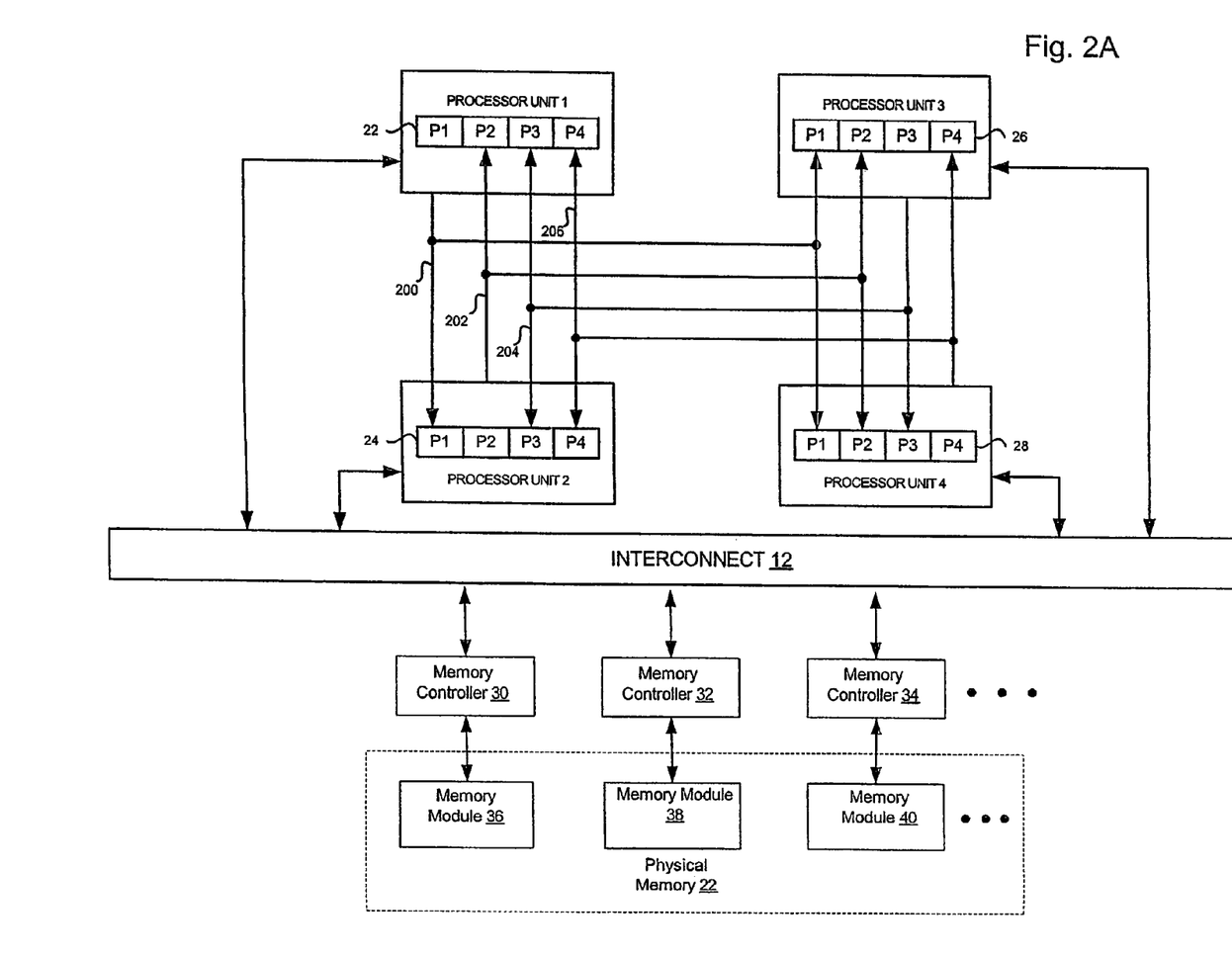
FIG. 2A shows a star-based bus structure interconnecting each of the PCRs in a simplified drawing of the data processing system, in accordance with a preferred embodiment of the present invention.

With reference now to FIG. 2A, there is shown a star-based bus structure interconnecting each of the PCRs in a simplified drawing of data processing system 8, in accordance with a preferred embodiment of the present invention. Each PCR 22-28 is divided into four sectors, each sector being designated for one of the four processors in data processing system 8, and each sector containing one byte of information in a preferred embodiment. As will be appreciated, PCRs 22-28 could be divided into any number of sectors, including a number equal to the number of processor units in the data processing system (e.g., 2, 4, 8, 16, 32, 64, etc.). Moreover, the number of bytes allocated per sector within PCRs 22-28 is not limited to just one byte as shown in the preferred embodiment, and is set to the number of bytes deemed necessary for providing the processor communication in a given architecture.

As shown in FIG. 2A, processor unit 1 can read the entire PCR 22 at any time, thereby having immediate access to processor communication information from all processors within the system. Similarly, processor unit 2 can read the entire PCR 24 at any time, processor unit 3 can read the entire PCR 26 at any time, and processor unit 4 can read the entire PCR 28 at any time. In one embodiment, sector P1 within all PCRs is controlled by processor unit 1, sector P2 within all PCRs is controlled by processor unit 2, sector P3 within all PCRs is controlled by processor unit 3, and sector P4 within all PCRs is controlled by processor unit 4. Only the processor unit that controls a sector can update, modify or store to that sector within the PCR. Thus, for example, only processor unit 1 can write to Sector P1 within PCRs 22-28. Similarly, processor unit 2 controls sector P2 and is the only processor unit within the system that can write to sector P2 within PCRs 22-28. Similarly, sectors P3 and P4 are controlled by processor units 3 and 4, respectively, such that only the controlling processor unit can write to the particular sector within PCRs 22-28. However, all processor units 1-4 can read from all sectors within the PCR contained within that processor unit.

As shown in FIG. 2A, interconnects 200-206 (collectively acting as an interconnect bus) are direct bus links between each of the processor units 1-4 that are independent and bypass interconnect 12 used by the memory system. Processor unit 1 writes directly to sector P1 in its PCR 22 to update its own processor communication information. Processor unit 1 also has a direct communication link to the other processor units 2-4 over interconnect 200. When writing to update its processor communication information, processor unit 1 writes through to PCRs 24-28 over interconnect 200, which directly ports the written data to the P1 sectors in the corresponding registers. In a similar manner, processor unit 2 writes through processor information to its sector P2 within its own PCR 24 and also transmits the processor communication information over interconnect 202 directly to the P2 sectors of PCRs 22, 26, and 28. Processor unit 3 writes through processor information to its sector P3 within its own PCR 26 and also transmits the processor communication information over interconnect 204 directly to the P4 sectors of PCRs 22, 24, and 28. Processor unit 4 writes through processor information to its sector P4 within its own PCR 28 and also transmits the processor communication information over interconnect 206 directly to the P4 sectors of PCRs 22, 24, and 26.

Various implementations of the star-based processor communication interconnect can be implemented in order to provide for the reading and writing of the PCR sectors for each of the processor units. As shown in FIG. 2A, each of the processor units is only allowed to write to its allocated sector within the PCRs. This could be implemented through a direct hard-wiring of the interconnects 200-206 such that only those sectors are accessible by the processor units. Alternatively, interconnects 200-206 could be a single communication bus or multiple communication buses that provide both the data and target address for the data, such that each processor unit can only target specific bytes within the register. For example, processor unit 2 only has authority to write to the second byte of each of PCRs 22-28. In order to read information, each processor unit 1-4 has the capability to read its own internal PCR. However, as will be appreciated, as the number of processor units within the system increases, the complexity of the interconnect bus system substantially increases with each added processor unit. In alternative embodiments, other processor units within the multi-processor system could be tied into the star-based network such that the processor can read the PCR of another processor unit. For example, a new processor unit 5 (not shown) could be wired into the star-based network to read register 28 and obtain the same processor communication information that processor units 1-4 are utilizing.

Figure 2B:
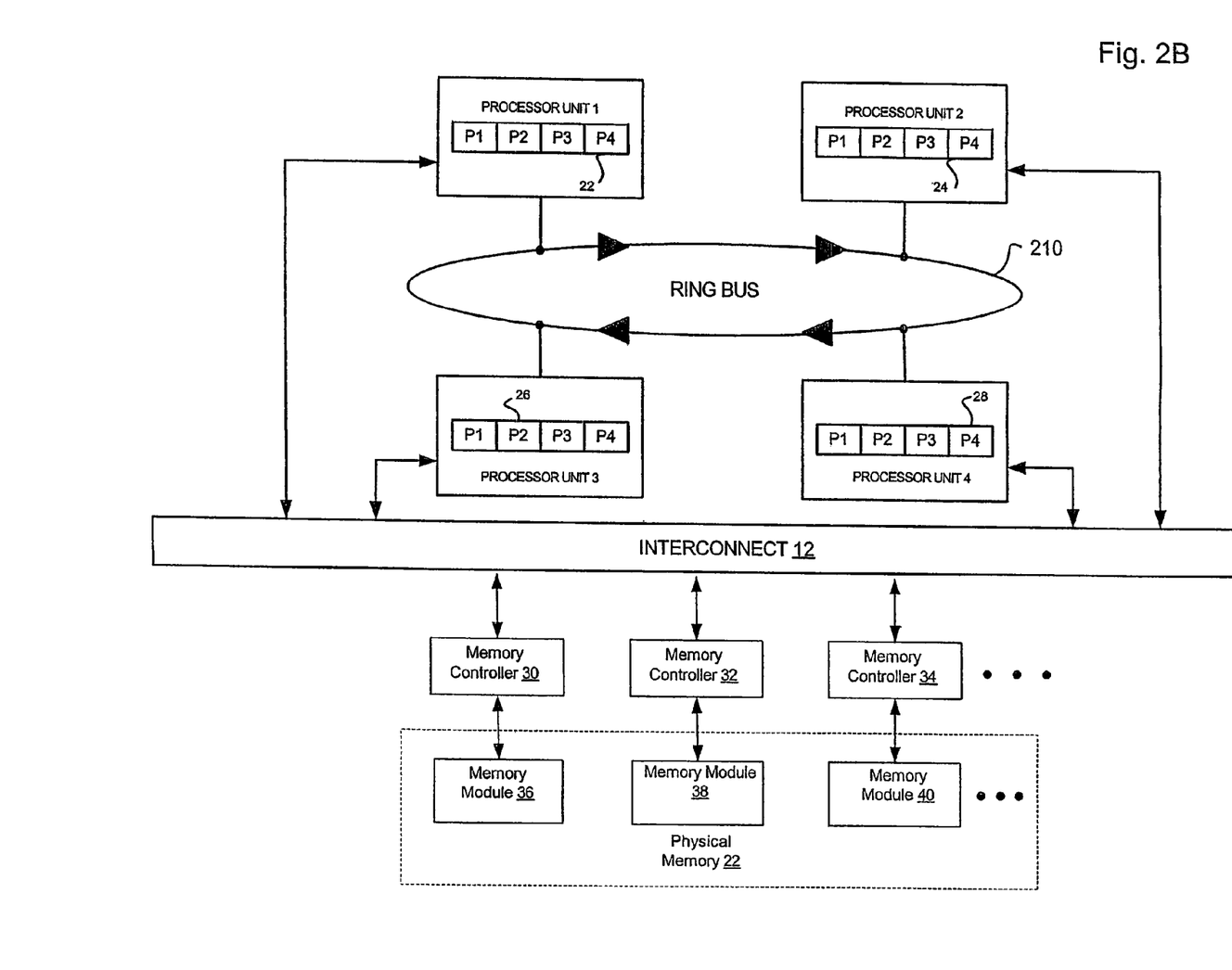
FIG. 2B shows a ring-based bus structure interconnecting each of the PCRs in a simplified drawing of the data processing system, in accordance with a preferred embodiment of the present invention.

With respect now to FIG. 2B, there is shown a ring bus structure interconnecting each of the PCRs in a simplified drawing of data processing system 8, in accordance with the preferred embodiment of the present invention. Ring bus 210 is a special communication interconnect that allows processor units within a multi-processor system to communicate special processor communication information that is stored in PCRs 22-28. Ring bus 210 is independent of the hierarchical memory system connected by interconnect 12 to the processor units 1-4. In the ring bus embodiment, data is passed in packages, utilizing a token-passing ring-based network, as is well known to those skilled in the art. As will be appreciated, the use of a ring bus is very scalable and does not limit the number of processor units that can be included in the data processing system. However, a star-based interconnect has a lower latency than the ring bus because each processor is directly connected to the other.

As each processor unit 1-4 requires to update its sector of the PCRs 22-28, the corresponding processor issues a store command in a "package" transported over ring bus 210. The package passes around the ring of the interconnect 210 and is received by each of the other processor units 1-4 connected to the ring bus. Each processor unit receiving a package over the ring bus 210 decodes the address contained within the package and stores the information to the associated sector of the PCR, or, alternatively, makes a determination about which processor unit issued the store instruction based on information contained in the package and then updates the PCR sector associated with that storing processor. To prevent collisions on ring bus 210, processor units 1-4 let packages from the other processors pass through the ring bus and before attaching its payload to the package at its tail end.

Figure 3A:
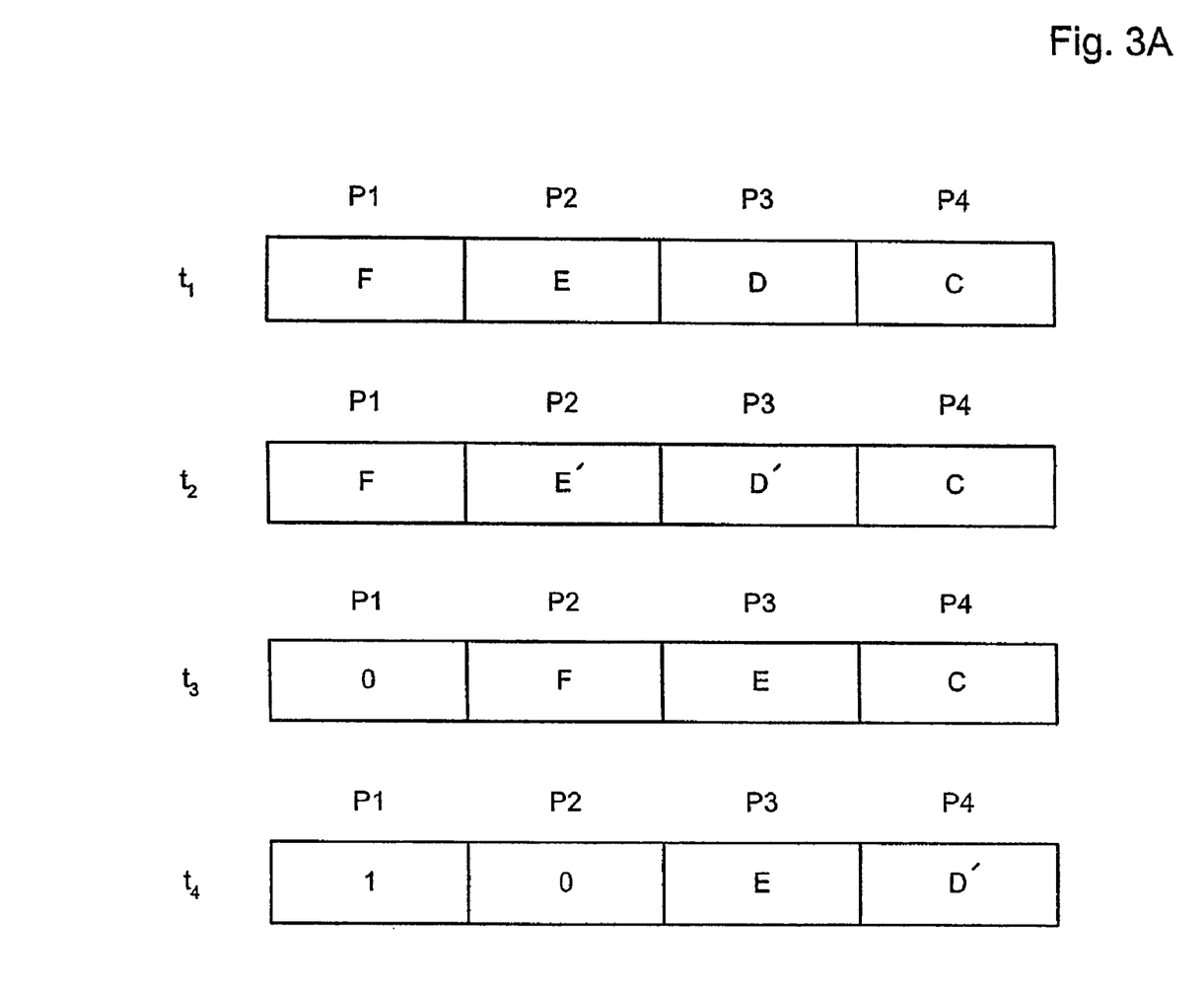
FIGS. 3A and 3B depict examples of using the PCR to facilitate pipeline and parallel processing, respectively, within a multi-processor system, in accordance with a preferred embodiment of the present invention.
Figure 3B:
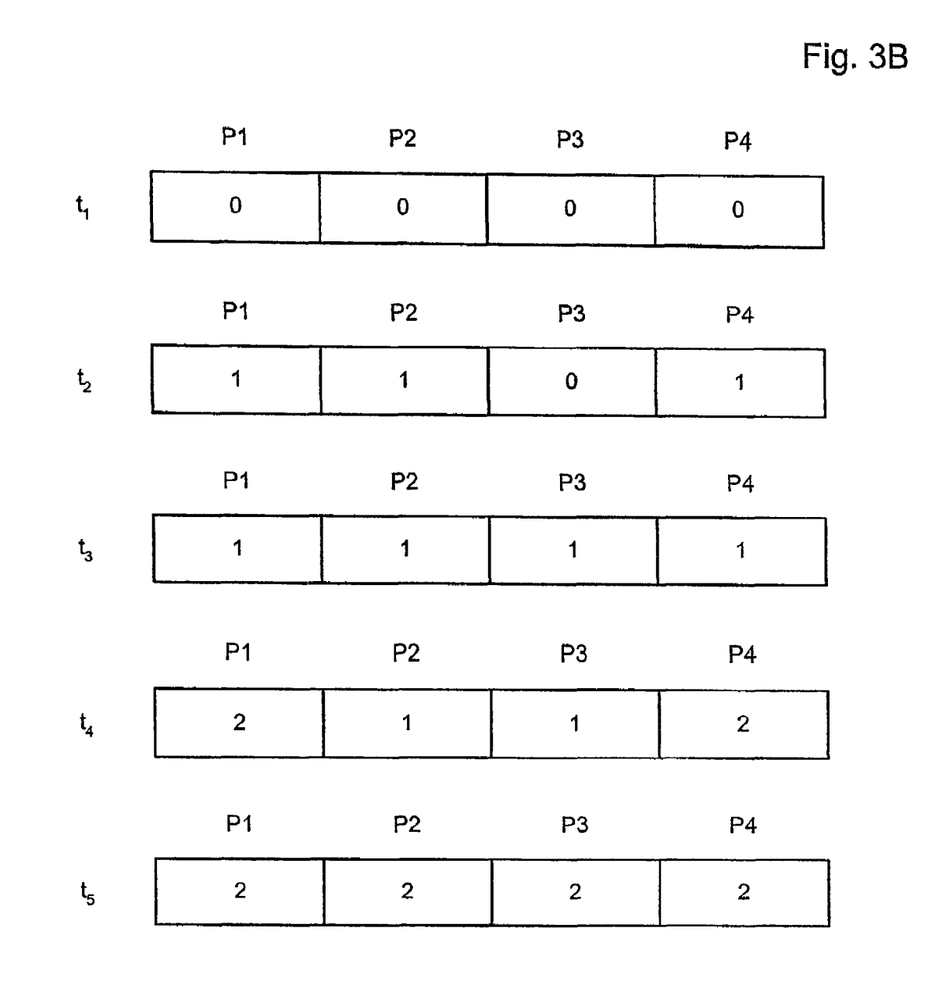

With reference now to FIGS. 3A and 3B, therein are provided examples of using the PCR to facilitate pipeline and parallel processing, respectively, within a multi-processor system, in accordance with a preferred embodiment of the present invention. When performing pipeline processing, each processor within a processor network is responsible for executing a particular algorithm associated with one piece of a computation. Typically in pipelined processing, a processing unit receives information that has been processed by a previous processor, performs its processing function on that data, and then passes the processed data on to a next processor in the pipeline to further process the data. For example, data processing system 8 could be processing a 16-kilobyte audio file to perform a variety of processing routines on the audio file. For example, one processor may be executing a routine to normalize the volume, another processor may be implementing a function to normalize the pitch, and another processor might be encrypting the audio file. Such a task lends itself to pipeline processing.

Depicted in FIG. 3A is the contents of the PCRs, where each row indicates the contents of a sector (P1, P2, P3 and P4) at a selected time, and each successive row represents the sectors at a different point in time ($t_1$, $t_2$, $t_3$ and $t_4$). At time $t_1$, each processor unit 1-4 sees that sector P1 indicates that processor unit 1 is currently processing the data labeled "F." Similarly, P2 is shown currently processing the data labeled "E," P3 is shown currently processing the data labeled "D" and P4 is shown currently processing the data labeled "C," wherein the bytes shown in FIG. 3A are represented by their hexadecimal representations. At time $t_2$, P1 still shows that processor unit 1 is still processing the data represented by F, but that processor units 2 and 3 have updated the PCR at P2 and P3 to show that they have completed processing data E and D, as represented by E' and D' respectively. P4 is shown as not having been updated, indicating that processor unit 4 is still processing the data associated with C.

At time $t_3$, processor unit 1 has updated the PCR at P1 to indicate that it has now begun processing the data associated with "0." Upon seeing the update within the PCR for P1, processor unit 2 understands that processor unit 1 has completed its routine on the data set associated with F and that it can begin its routine on that data. Processor unit 2 updates the PCR in its sector P2 to indicate F, and then retrieves the associated data from the cache subsystem in order to begin its routine. Similarly, processor unit 3, seeing that processor unit 2 has now completed its routine on data set E and has released its control, updates its sector P3 within the PCR to indicate that it has now begun working on data set E. Although processor unit 4 can see at time $t_3$ that processor unit 3 has completed work on data set D, it has not completed its routine on data set C and so has not updated the PCR. At time $t_4$, processor unit 1 has completed its routine on data set 0 and has begun processing data set 1, as indicated by its updating the PCR in its sector P1 to show it is working on data set 1. Similarly, processor unit 2 has completed work on data set F and has begun to perform its function on data set 0, since it sees processor unit 1 has completed work on data set 0 by its update to its sector P1 within the PCR. At time $t_4$, processor unit 3 has not completed its routine on data set E and so its sector P3 within the PCR has not been updated. Processor unit 4 has completed its operation on data set D as indicated by D'. Because processor 3 has not yet completed its process on data set E, processor 4 cannot begin work on that data set and so has not updated the PCR accordingly.

As can be seen, the preferred embodiment of the present invention facilitates pipeline processing by allowing each processor unit within the system to immediately have access to processor communication information from other processors that indicates the current status of each processor in executing their process on a particular data set. This provides efficient coordination of the processors through efficient processor communication concurrent with the pipeline processing of the data sets.

With reference now to FIG. 3B, there is shown an example of utilizing the PCR in parallel processing, in accordance with the preferred embodiment of the present invention. In this example, each processing unit within data processing system 8 is working on different interrelated pieces of the same problem, but that the data dependencies between the data sets being processed require that they be executed in parallel, thereby requiring coordination between the processing units as the data is processed. As seen in FIG. 3B, at time $t_1$, each processing unit 1-4 has updated their sector within the PCR to indicate they are currently processing the data set represented by "0". At time $t_2$, P1, P2, and P4 have been updated to indicate that processing units 1, 2, and 4 are ready to begin processing data set 1, but that P3 indicates that processing unit 3 continues to process data set 0. It is not until time $t_3$ that processing unit 3 updates P3 to indicate that it has completed processing data set 0. At that point, each processing unit 1-4 begins parallel processing data set 1. At time $t_4$, P1 indicates that processing unit 1 has completed processing data set 1 and is ready to begin processing data set 2. P2 and P3 indicate that processing units 2 and 3 are continuing to process data set 1. P4 shows that processing unit 4 has completed data set 1 and is prepared to begin processing data set 2. At time $t_5$, processing unit 2 and 3 have completed processing data sets 1 and have updated the PCR to indicate they are ready to begin processing data set 2. At that point, each processing unit 1-4 begins processing data set 2 in parallel. As will be appreciated, the PCR allows each of the processing units 1-4 to synchronize their parallel processing of the data sets by having immediate access to the processor communication information stored in each of the PCRs and without consuming any bandwidth of the cache subsystem interconnect to update and coordinate the parallel process with each of the processing units.

Figure 4A:
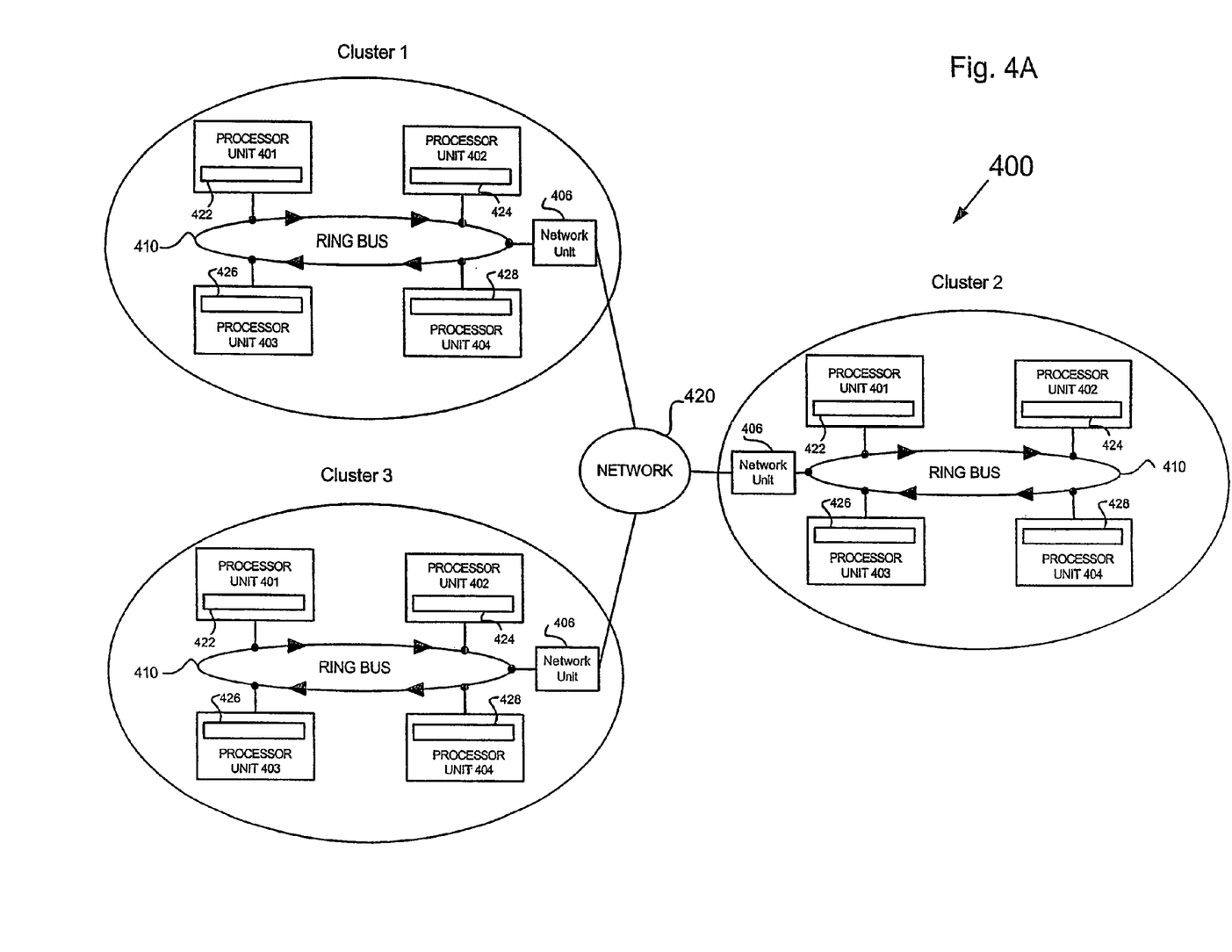
FIG. 4A depicts a cluster-based data processing network with improved processor communications, in accordance with the preferred embodiment of the present invention.

With reference now to FIG. 4A, there is shown a cluster-based data processing network with improved processor communications, in accordance with the preferred embodiment of the present invention. Data processing system 400 includes Cluster 1 (C1), Cluster 2 (C2), and Cluster 3 (C3) interconnected by network 420. Each cluster C1-C3 contains four processor units 401-404 interconnected by a ring bus 410. Each processor unit 401-404 contains a PCR 422-428, respectively, containing 12 bytes of processor communication information. Each cluster C1-C3 includes a network card 406 connected to ring bus 410 and making the interconnection of its cluster to network 420. Network 420 can be implemented in at least three different embodiments to provide the interconnect between PCRs used in the processor communications of the preferred embodiment: (1) a standard data network having a private protocol that allows a special data packet to be transmitted between clusters, (2) a standard data network transmitting unique Internet Protocol addresses used only for storing data into PCRs, and (3) a separate data network dedicated to transmitting processor communication information to PCRs.

In a preferred embodiment of network 420, network 420 would be implemented using a private protocol layered on top of a standard network protocol such as Gigabyte Ethernet or an IP-based protocol within the computer system data network, such as a local area network (LAN) or the Internet. To provide communication between the cluster processors and other processors located in a different cluster, a point-to-broadcast type of special packet using the private protocol is transmitted over the system network. As used in a preferred embodiment, network 420 generally utilizes a communication protocol such as the Transmission Control Protocol/Internet Protocol (TCP/IP) to provide communication of data and instructions between each of the clusters C1-C3. Network card 406 utilizes the unique IP address identifying its cluster for receipt and transmission of inter-cluster communications.

Figure 4B:
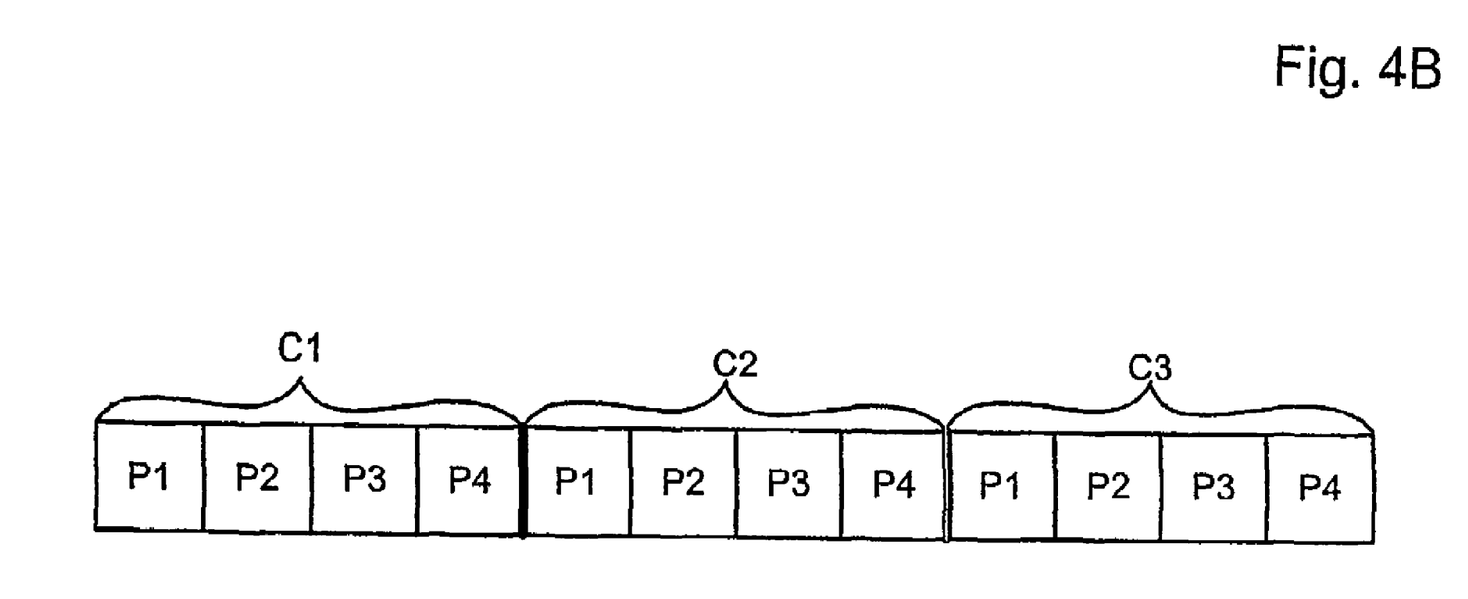
FIG. 4B shows a data format for the processor communication registers contained within all processor units in clusters C1-C3, in accordance with a preferred embodiment of the present invention.

To update the PCRs, the updating processor sends out over the ring bus 410 a store-through command to update its sector of each PCR. The other processors in its cluster update their own PCR by indexing to the address in the packet as transmitted by the processor. Network unit 406 receives the command and inserts it into a special, private-protocol TCP/IP packet addressed to the IP addresses of the other clusters in the data processing system 400. The special PCR packet is transmitted over network 420 and received by the network units 406 of the other clusters. The payload is decoded unlike other standard packets in that the TCP/IP protocol stack is bypassed, and, instead, the payload is merely stripped from the packet and transferred to processor units 401-404 over ring bus 410 as a store-through command to update the addressed sector (or sectors, if the payload contains multiple updates of sectors) in the PCRs 422-428. Each of the sectors within the PCRs are addressed by indexing to the sector or sectors associated with the processor unit or units in the transmitting cluster that are updating their processor communication information, as is depicted in FIG. 4B. In this way, a special type of IP packet utilized by clusters C1-C3 provides for the update of all PCRs contained in other clusters.

With reference now to FIG. 4B, there is shown a data format for the PCRs contained within all processor units in clusters C1-C3, in accordance with a preferred embodiment of the present invention. Each processor unit 401-404 contains a PCR 422-428, respectively, containing 12 bytes of data, each controlled by a respective processor P1-P4 of the designated cluster C1-C3, as shown in FIG. 4B. Because each processor unit retains its own copy of the same processor communication information in its PCR, the most updated processor communication information is immediately and continuously available from all clusters C1-C3. When a processor unit within a cluster requires to update its processor communication information contained within the PCRs throughout the network, that processor updates the byte it controls within the PCRs by issuing a special write-through instruction onto ring bus 410 addressed to its allocated byte within PCRs 422-428. For example, within cluster C2, processor unit 3 would store-through to the seventh byte within PCRs 422-428. Each of the other processor units in cluster C2 (processor unit 1, 2, and 4) would proceed to update the seventh byte within their corresponding PCR. When network card 406 receives the store-through request from processor unit 3, it packages the command (if necessary) and transmits the store-through command over network 420 addressed to the IP addresses of clusters C1 and C3 (in one or more packages, depending on the implementation). Each of the clusters C1 and C3 would decode the store request by utilizing the IP address of the sending cluster C2 to determine that the third processor unit 3 (P3) of cluster C2 was updating the seventh byte of the PCR.

With reference back to FIG. 4A, in another preferred embodiment of network 420, network 420 would be implemented using a private protocol layered on top of a standard network protocol, but where each cluster C1-C3 has its own unique IP address used exclusively for updating the PCR and independent of the general IP address used by network 420 to communicate with the clusters. To update the PCRs, the updating processor sends out a store-through command over the ring bus 410 to update its sector of the PCR. The other processors in the cluster connected to the ring bus 410 update their own PCR by indexing to the address in the packet as transmitted by the processor. Network unit 406 receives the command and inserts it into a TCP/IP packet addressed to the unique IP addresses set aside for updating the PCRs in the other clusters of the data processing system 400. This special PCR packet is transmitted over network 420 and received by the network units 406 of the other clusters based on the unique IP address for their PCRs. The payload is decoded and transferred to processor units 401-404 over ring bus 410 as a store-through command to update the addressed sector (or sectors, if the payload contains multiple updates of sectors) in the PCRs 422-428. Each of the sectors within the PCRs are addressed by indexing, as referenced in FIG. 4B, to the sector or sectors associated with the processor unit or units in the transmitting cluster that is updating its processor communication information.

In still another preferred embodiment of network 420, network 420 would be implemented using a separate, private network dedicated to updating PCRs and which is independent from the standard network interconnecting the clusters. In one preferred embodiment of a dedicated network 420, the interconnect is implemented using separate point-to-point buses interconnecting each of the clusters to one another. Network units 406 coordinate the direct communications and transfer the store-through from other clusters onto its associated ring bus 410. In another preferred embodiment of a dedicated network 420, the interconnect is implemented using a packet-based network and private protocol to communicate with the clusters. It could also use standard protocols such as Gigabyte Ethernet or an IP-based protocol, or some customized variation thereof. To update the PCRs in this embodiment, the updating processor sends out a store-through command over the ring bus 410 to update its sector of the PCR. The other processors in the cluster connected to the ring bus 410 update their own PCR by indexing to the address in the packet as transmitted by the processor. Network unit 406 receives the command and inserts it into a packet addressed to the unique IP addresses set aside for updating the PCRs in the other clusters of the data processing system 400. The special PCR packet is transmitted over dedicated network 420 and received by the network units 406 of the other clusters. The payload is decoded and transferred to processor units 401-404 over ring bus 410 as a store-through command to update the addressed sector (or sectors, if the payload contains multiple updates of sectors) in the PCRs 422-428. Each of the sectors within the PCRs are addressed by indexing, as referenced in FIG. 4B, to the sector or sectors associated with the processor unit or units in the transmitting cluster that is updating its processor communication information.

Figure 5:
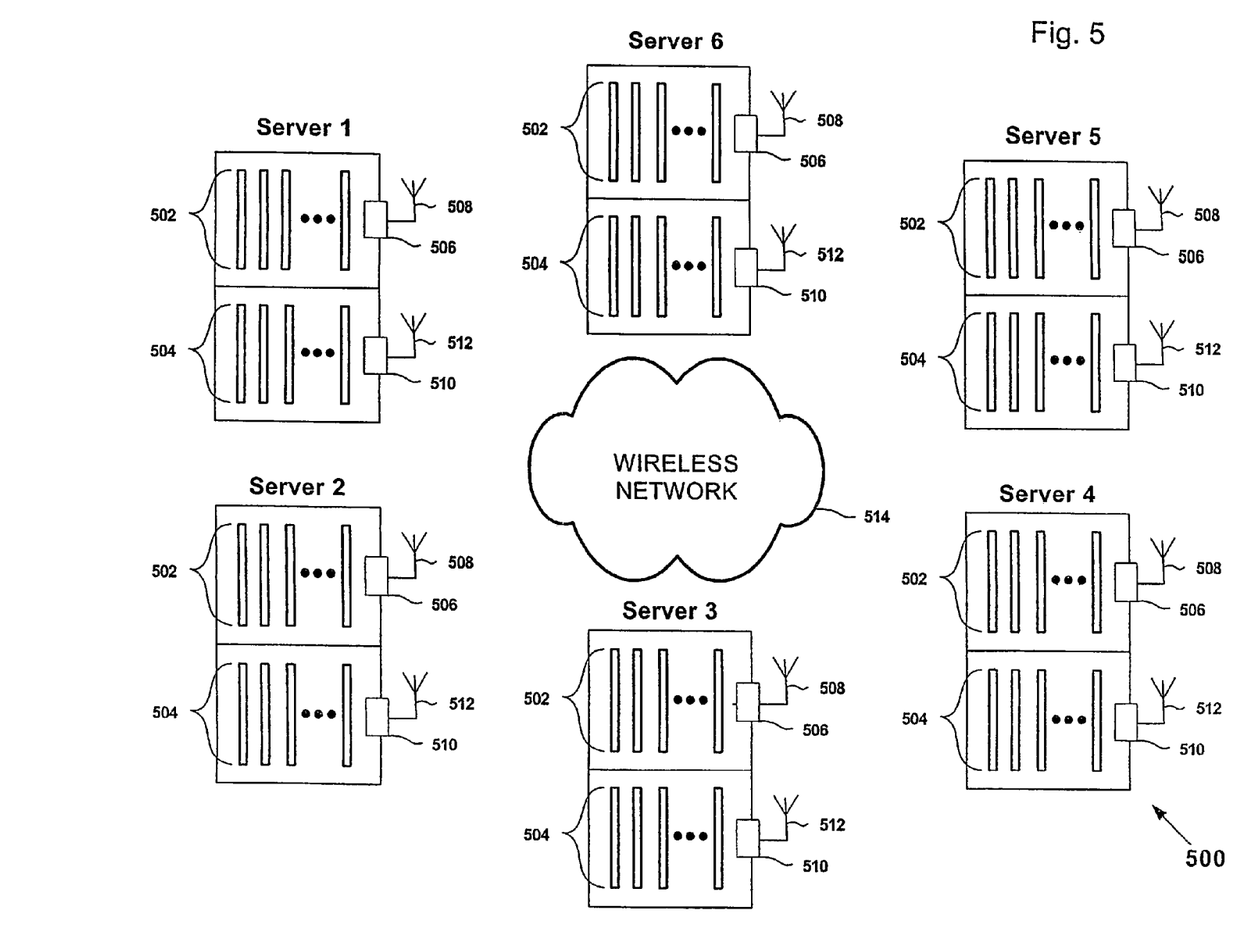
FIG. 5 depicts a data processing system utilizing an independent wireless network to provide improved processor communication, in accordance with a preferred embodiment of the present invention.

With reference now to FIG. 5, there is shown a data processing system utilizing an independent wireless network to provide improved processor communication, in accordance with a preferred embodiment of the present invention. Data processing system 500 has a plurality of interconnected server computers co-located to cooperatively perform complex and/or data intensive computing (commonly referred to as a server farm). In the example of FIG. 5, server farm 500 is comprised of six servers (Servers 1-6). Each server 1-6 includes two "drawers" containing a plurality of server blades 502, 504. As will be appreciated, each server blade 502, 504 may contain a number of symmetric multi-processors. In a preferred embodiment, each server blade 502, 504 would be configured with data processing systems, for example, such as data processing system 8, shown in FIG. 1, that are configured with a plurality of processors using a ring-based interconnect for communication between each processor communication register contained in each processor of the server blade (for example, as shown in FIG. 2B). As will be appreciated, server farm 500 is shown having six servers for only illustrative purposes and is not limited to any particular number of servers. As will be further appreciated, each server blade 502, 504 could contain any number of processors (e.g., 2, 4, 8, 16, 32, etc.) and is not limited to four processors as shown in FIG. 2B.

In accordance with a preferred embodiment of the present invention, server blades 502 in servers 1-6 have a ring-based bus (not shown) interconnecting the PCRs (not shown), contained in each of the processor units (not shown) in server blades 502, with a wireless network card 506 in the same manner that PCRs in processor units 401-404 and network card 406 are interconnected by ring bus 410 as shown in FIG. 4A. Wireless network card 506 operates identically to network card 406 seen in FIG. 4A, except that it interconnects with other wireless network cards 506, 510 within server farm 500 over a wireless network 514 via transmissions through antenna 508. Similarly, server blades 504 are interconnected with wireless network card 510 utilizing a ring network interconnecting each of the PCRs in server card processors. Wireless network card 510 wirelessly communicates with wireless network 514 via antenna 512. In the same way, each of the server blades 502, 504 of servers 1-6 are interconnected to wireless network 514 to create a cluster-based network having 12 separate clusters (comprised of the 12 server drawers).

Each cluster within server farm 500 updates its respective processor communication information contained within the PCRs in the same manner as clusters of network 400. However, in this case, the communication to each of the clusters for updating the processor communication information in the PCRs is done over a wireless network. Each wireless network card 506, 510, listens on all designated frequencies, awaiting an update to the PCR by another cluster within the server farm 500. In an embodiment utilizing Frequency Division Multiplexing (FMA), when a cluster requires to write-through to the other clusters to update its PCR sector, it transmits the store-through information on its unique frequency. No other cluster within the server farm 500 transmits over that particular frequency, thereby uniquely identifying a particular processor within a particular cluster with authorization to write to that sector of the PCR—complex IP-based addressing and protocols are not necessary. For example, in a preferred embodiment, each of the wireless network cards 506, 510 communicate with each other utilizing a standard wireless network protocol such as the IEEE 802.11(a) protocol, which uses an Orthogonal FDM. In alternative preferred embodiments, the wireless network utilizes Time Division Multiplexing (TDM) or Code Division Multiplexing (CDM) transmission systems.

In an alternate preferred embodiment, each server blade of server blades 502, 504 itself contains a wireless network card that is interconnected to the server blade's processors through a ring bus, and that communicates with all other server blades within server farm 500 wirelessly over the wireless network 514. For example, each server blade 502, 504, would be configured as shown with cluster C1 in FIG. 4A, but network card 406 would be enabled with wireless capability to provide the interconnect communication over network 420 with other clusters. As will be appreciated, the server farm embodiments utilizing a wireless network connection to provide processor communication information substantially increases the speed of the PCR update process by bypassing complex protocol stacks and latency delays of ring-based cluster networks.

While the invention has been particularly shown and described with reference to a preferred embodiment, it will be understood by those skilled in the art that various changes in form and detail may be made therein without departing from the spirit and scope of the invention.

What is claimed is:

1. A multiprocessor system comprising:
a plurality of processors coupled for communication;
wherein each processor contains a respective internal processor communication register (PCR) having a plurality of sectors, wherein each processor has continuous read access to retrieve information stored in each sector of the plurality of sectors within its PCR, and wherein each sector of the plurality of sectors within each PCR is allocated for store access by only an associated one of the plurality of processors; and
wherein the plurality of processors coordinate, with reference to the PCRs, multi-processing of a plurality of data sets each having a respective identifier, by each of multiple processors storing an identifier of a data set into its allocated sector in multiple PCRs in the plurality of processors, and by each of the plurality of processors retrieving at least one identifier of a data set from its internal PCR and, responsive thereto, scheduling its processing of one of the plurality of data sets.

2. The multiprocessor system of claim 1, wherein the plurality of processors coordinate pipelined multi-processing by reference to the PCRs.

3. The multiprocessor system of claim 1, and further comprising a system memory accessible to all of said plurality of processors, wherein each processor of the plurality of processors updates each sector within each PCR within the plurality of processors that is associated with that processor such that each processor of the plurality of processors containing a PCR has access to information stored in each updated sector of the plurality of sectors without retrieving such information from the system memory.

4. The multiprocessor system of claim 1, further wherein at least two processors of the plurality of processors simultaneously retrieve information from their respective PCR.

5. The multiprocessor system of claim 1, wherein the same information is contained in each respective PCR contained in the plurality of processors.

6. The multiprocessor system of claim 1, wherein:
said multi-processor system includes a system interconnect coupling said plurality of processors and a system memory; and
each of the multiple processors store identifiers of data sets in PCRs by issuing a store command on the system interconnect.

7. The multiprocessor system of claim 1, wherein:

said multi-processor system includes a system interconnect coupling said plurality of processors and a system memory; and said multi-processor system includes a dedicated interconnect that is separate from the system interconnect and that couples the plurality of processors; and each of the multiple processors store identifiers of data sets in PCRs via the dedicated interconnect.

8. The multiprocessor system of claim 1, wherein each of said plurality of processors polls its internal PCR to detect updates, wherein a processor among said plurality of processors retrieves at least identifier from its internal PCR and schedules processing of a data set in response to detecting an update to its internal PCR.

9. The multiprocessor system of claim 1, wherein the plurality of processors coordinate parallel multi-processing by reference to the PCRs.

10. The multiprocessor system of claim 1, wherein said identifiers in said PCRs indicate which data sets are undergoing processing by said plurality of processors.

* * * * *